(12) United States Patent
Han et al.

(10) Patent No.: US 7,898,773 B2
(45) Date of Patent: Mar. 1, 2011

(54) PERPENDICULAR MAGNETIC RECORDING HEAD WITH A SIDE WRITE SHIELD

(75) Inventors: Cherng-Chyi Han, San Jose, CA (US); Min Li, Dublin, CA (US); Fenglin Liu, Milpitas, CA (US); Jiun-Ting Lee, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1106 days.

(21) Appl. No.: 11/345,892

(22) Filed: Feb. 2, 2006

(65) Prior Publication Data

US 2007/0177301 A1    Aug. 2, 2007

(51) Int. Cl.
*G11B 5/127* (2006.01)

(52) U.S. Cl. .............. 360/319; 360/125.09; 360/125.13

(58) Field of Classification Search .................. 360/319, 360/123.12, 123.37, 123.58, 125.09, 125.13, 360/125.59, 125.64, 125.19, 125.46, 125.51
See application file for complete search history.

(56) References Cited

U.S. PATENT DOCUMENTS

| | | | |
|---|---|---|---|
| 5,673,163 A * | 9/1997 | Cohen .................. | 360/125.51 |
| 6,532,236 B1 | 3/2003 | De Vriendt | |
| 6,741,433 B1 | 5/2004 | Nishioka | |
| 6,754,054 B2 | 6/2004 | Seigler et al. | |
| 6,809,899 B1 * | 10/2004 | Chen et al. ............. | 360/125.13 |
| 6,912,769 B2 | 7/2005 | Yoda et al. | |
| 7,002,775 B2 * | 2/2006 | Hsu et al. .............. | 360/125.03 |
| 7,248,431 B1 * | 7/2007 | Liu et al. ............... | 360/119.02 |
| 2002/0071208 A1 | 6/2002 | Batra et al. | |
| 2002/0176214 A1 * | 11/2002 | Shukh et al. ................ | 360/317 |
| 2004/0218309 A1 | 11/2004 | Seigler | |
| 2005/0057852 A1 * | 3/2005 | Yazawa et al. .............. | 360/125 |
| 2005/0068678 A1 * | 3/2005 | Hsu et al. .................... | 360/126 |
| 2005/0162778 A1 | 7/2005 | Kimura et al. | |
| 2006/0002014 A1 * | 1/2006 | Sasaki et al. ................ | 360/125 |
| 2006/0245108 A1 * | 11/2006 | Hsu et al. .................... | 360/125 |

* cited by examiner

*Primary Examiner*—Brian E Miller
*Assistant Examiner*—Adam B Dravininkas
(74) *Attorney, Agent, or Firm*—Saile Ackerman LLC; Stephen B. Ackerman

(57) ABSTRACT

A perpendicular magnetic recording (PMR) head is fabricated with a pole tip shielded laterally by a separated pair of side shields and shielded from above by an upper shield. The side shields are formed by a RIE process using specific gases applied to a shield layer through a masking layer formed of material that has a slower etch rate than the shield material. A masking layer of Ta, Ru/Ta, TaN or Ti, formed on a shield layer of NiFe and using RIE gases of $CH_3OH$, CO or $NH_3$ or their combinations, produces the desired result. The differential in etch rates maintains the opening dimension within the mask and allows the formation of a wedge-shaped trench within the shield layer that separates the layer into two shields. The pole tip is then plated within the trench and, being aligned by the trench, acquires the wedge-shaped cross-section of the trench. An upper shield is then formed above the side shields and pole.

7 Claims, 5 Drawing Sheets

PERPENDICULAR MAGNETIC RECORDING HEAD WITH A SIDE WRITE SHIELD

BACKGROUND OF THE INVENTION

1. Field of the Invention

This invention relates generally to magnetic recording heads, particularly to perpendicular recording heads that produce their recording magnetic fields perpendicularly to the recording medium 2. Description of the Related Art The increasing need for high areal recording densities (up to 500 Gb/in$^2$) is making the perpendicular magnetic recording head (PMR head) a replacement of choice for the longitudinal magnetic recording head (LMR head). By means of fringing magnetic fields that extend between two emerging pole pieces, longitudinal recording heads form small magnetic domains within the surface plane of the magnetic medium (hard disk). As recorded densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed perpendicularly to the disk surface and a soft magnetic underlayer (SUL) formed within the medium acts as a stabilizing influence on these perpendicular domain structures. Thus, a magnetic recording head that produces a field capable of forming domains perpendicular to the disk surface, when used in conjunction with such perpendicular media, is able to produce a stable recording with a much higher area density than is possible using standard longitudinal recording. In this regard, Yoda et al. (U.S. Pat. No. 6,912,769) teaches a thin film magnetic head for perpendicular recording in which the main magnetic pole tip protrudes through an aperture formed within a thin film.

A significant problem with magnetic pole structures that are currently used to produce perpendicular fields, is that the fields tend to exhibit significant lateral fringing, thereby producing unwanted side-writing (writing in adjacent tracks). This problem is much more evident in the perpendicular writing head than in the longitudinal writing head, even when the perpendicular head is shielded laterally to contain the fringing fields.

Among the efforts in the prior art to address the adverse effects of field fringing is the shielded head of Hsu et al. (US Patent Application Publication US2005/0068678) that uses side shields connected to a trailing shield by ferromagnetic studs. By locating the studs behind the ABS of the head, the return flux flow does not impinge on the disk itself. Yazawa et al. (US Patent Application Publication US 2005/0057852) teaches a perpendicular magnetic writing pole that includes a shield layer conformally formed over the pole. Thus, there is a single piece shield that covers top and side surfaces of the pole. Such integral formation allows the formation of a large shield which, it is suggested, is better able to absorb the return flux of the recording head. Batra et al. (US Patent Application Publication US 2002/0071208) teaches a perpendicular magnetic recording head in which the write pole is structured so that its return pole is itself formed surrounding the main pole. Thus it is the pole shape that eliminates a large degree of undesirable field fringing. The pole can, in addition, be surrounded by side shields to further reduce the effects of fringing. Kimura et al. (US Patent Application Publication US 2005/0162778) describes a method of forming the track restriction region of the main pole of a perpendicular recording head using an ion milling process. There is no particular mention of the formation of shields around the pole.

Unlike the prior art cited above, the present invention provides a method of forming a three-way side shielded head (top and side shields) that significantly reduces side fringing and, as a result, allows the formation of a larger pole, while providing the same degree of track resolution and protection from side overwriting. As an aspect of the invention, the side shields themselves are used to form the pole tip, using a trench formed within the side shields to provide a self-aligned method of shaping the pole tip in an advantageous manner.

SUMMARY OF THE INVENTION

A first object of this invention is to provide a method of forming a shielded pole structure for a perpendicular magnetic recording (PMR) head capable of recording at high area densities (up to 500 Gb/in$^2$).

A second object of the present invention is to provide a method of forming such a pole structure for a perpendicular magnetic recording head in which side fringing of the magnetic field is significantly reduced.

A third object of the present invention is to provide a method of forming a perpendicular magnetic write head in which the magnetic pole is shielded from above and from its sides.

A fourth object of the present invention is to provide a method of forming a perpendicular magnetic write head in which the effectiveness of the shielding allows the formation of a larger physical pole.

A fifth object of the present invention is to provide a method of forming a perpendicular magnetic write head in which the pole tip is formed using the shape of the side shields to provide alignment.

A sixth object of the present invention is to provide the pole structure for the perpendicular magnetic recording head that is formed by the method.

The objects of the present invention are realized by the formation of a self-aligned, three-way shielded PMR pole structure to be used within a PMR head wherein a pair of side shield are formed using reactive ion etching (RIE) or ion beam etching (IBE) together with a combination of gases selected to achieve high etch selectivity between a metal mask formed of Tantalum (Ta) and magnetic shield material formed of nickel-iron (NiFe) alloy. The selectively etched RIE (or IBE) process allows the dimensions of the mask opening to remain well defined while a beveled trench is formed within a layer of the aforesaid shield material, thereby separating the layer into two separate side shields whose sidewalls are the walls of the trench. A magnetic pole is then formed within the trench, the bevel angle of the magnetic pole being determined (ie., self-aligned) by the sidewall profile of the magnetic shield. Within the process, the metal mask advantageously also serves as a stopping layer for a chemical mechanical polishing (CMP) step. An upper shield is thereafter formed over the pole and side shields, creating the final three-way shielded structure of the present invention. The invention does not describe other elements of the write head, such as energizing coils, since these are well known in the prior art.

DESCRIPTION OF THE PREFERRED EMBODIMENTS

The preferred embodiment of the present invention is a three-way shielded pole structure for use within a perpendicular magnetic recording (PMR) head, in which the pole tip is formed and shaped within a trench between a pair of side shields and is thereafter covered from above by an upper shield. This three-way shield formation (two side shields, one upper shield) effectively eliminates side writing by the pole and, thereby, allows the formation of a physically larger pole while still maintaining desired track width definition.

Figure 1:
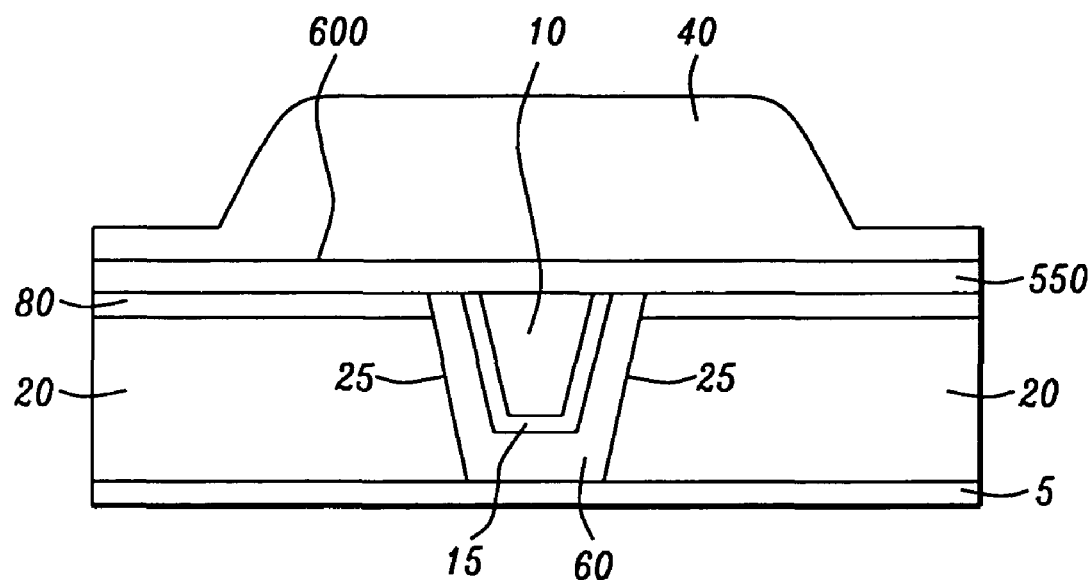
FIG. 1 is a schematic representation of an air bearing surface (ABS) surface cross-sectional view of the shielded PMR pole structure of the present invention.
Figure 2:
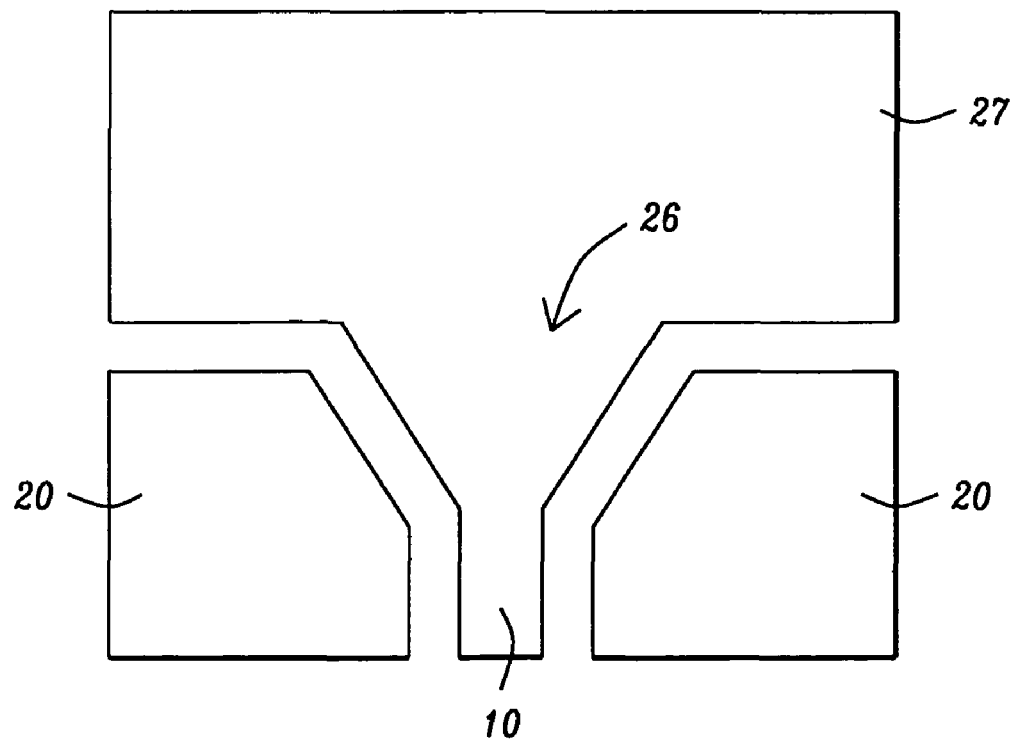
FIG. 2 is a schematic representation of an overhead view, through an intermediate level horizontal cross-sectional plane, of the pole structure in FIG. 1.

Two views of the finished pole fabrication can be seen by referring to FIGS. 1 and 2. FIG. 1 is a schematic view through the ABS plane of the shielded PMR pole structure as it appears when formed as part of the PMR head (nominally called the "front" of the head) showing, in cross-section, a substrate (5), the beveled pole tip (10), two opposing side shields (20) laterally disposed about the pole tip and an upper shield (40) formed on a seed layer (600) above the pole. The rear portion of the pole is not seen in this figure, but is seen (as (27)) in the overhead view of FIG. 2. It is understood that the pole structure that is the subject of the present invention will be formed as part of a complete write head that includes, for example, a coil structure to energize the pole.

FIG. 1 also shows a seed layer (15) on which the pole is plated, a horizontal write gap layer (550) preferably formed of alumina, an alumina side gap insulating layer (60) surrounding the pole and seed layer, and the possible remnants of a metal etch mask and CMP stopping layer (80) that was used to shape the side shields. As can be seen, the facing surfaces (25) of the two side shields are slanted in such a way as to form a truncated wedge-shaped opening, widest at the upper shield surface, within which is formed the beveled pole tip.

Referring now to FIG. 2, there is shown an overhead cross-sectional view through a horizontal plane of the fabrication of FIG. 1. Because of the position of the plane, the upper shield is not shown. Two separated side shields (20) are seen laterally disposed about the pole tip (10). The length of the pole tip is between approximately 0.05 and 0.15 microns and it extends transversely (i.e., perpendicularly to the ABS plane defining the front of the shields and from front to rear of the shields) substantially the entire length of the separation between the side shields. The width of the pole tip at the ABS is between approximately 100 to 180 nanometers and the pole tip flares out (26) behind the side shields to form a rear portion (27) of the pole piece. A spirally wound conducting coil (not shown in this figure) is formed around a rear portion of the pole, as is well known in the art. When energized by a current, the coil will produce a substantially perpendicular magnetic field emerging from the pole tip.

Figure 3:
FIGS. 3-11 are schematic views of the successive process steps required to complete the fabrication shown in FIGS. 1 and 2.

Referring now to FIG. 3, there is shown, schematically, the first step in a preferred process embodiment that will form the fabrication of FIGS. 1 and 2. In this step, a layer of shield material (200) is preferably plated on an alumina substrate (5), which would include a seed layer for the purpose of the plating process. The shield material is a layer of magnetic material such as NiFe (or $Fe_{85}Ni_{15}$) and it is plated to a thickness between approximately 3000 and 4000 angstroms.

Figure 4:
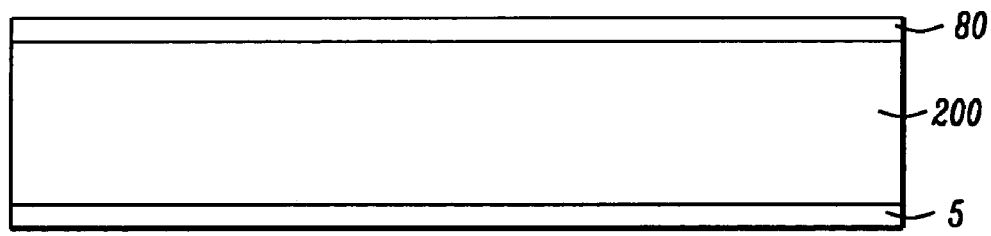

Referring now to FIG. 4, there is shown the fabrication of FIG. 3 wherein a metal mask layer (80), such as a layer of Ta, TaN, Ru/Ta, or Ti, has been formed to a thickness between approximately 800 and 1000 angstroms on the upper surface of the shield layer (200). The mask layer should have high etch selectivity in comparison to the shield layer, that is, it should etch more slowly than the shield material, both when using an IBE for patterning an opening in the mask and when using RIE to etch away the shield material exposed by the opening. This selectivity will allow the dimensions of the mask opening to remain well defined during the etch process. The mask layer will also be used as a CMP stopping layer at a subsequent step in the process.

Figure 5:
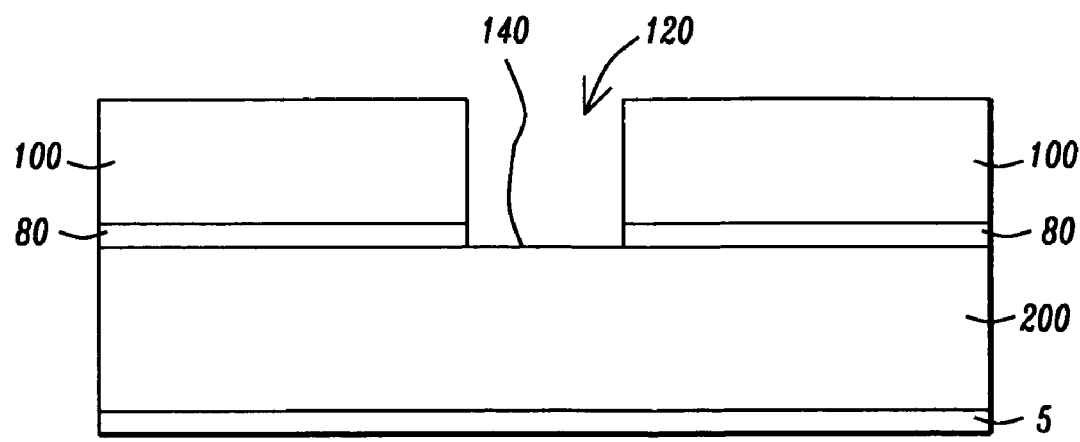

Referring next to FIG. 5, there is shown a patterned layer of photoresistive material (100) formed over the mask layer. An IBE has already been applied through the opening (120) in the photoresistive material to create a corresponding opening in the mask layer and to expose a portion of the shield layer (140). The opening is directed transversely to the ABS of the PMR head being fabricated.

Figure 6:
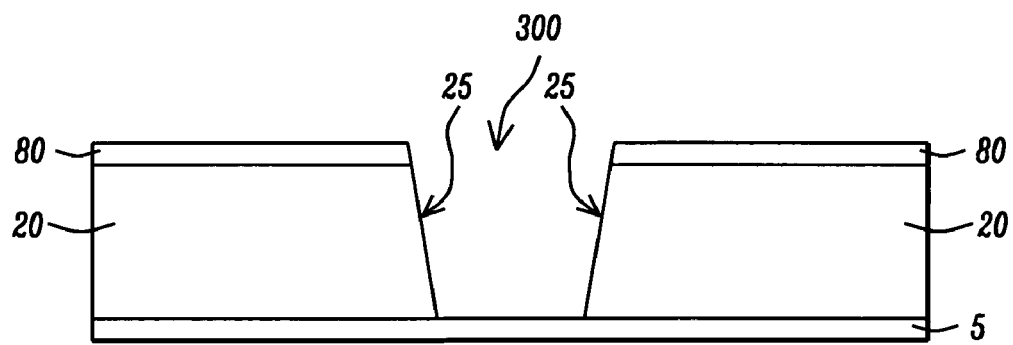

Referring next to FIG. 6, there is shown the fabrication of FIG. 5 subsequent to the application of a RIE to the shield layer through the mask opening. The RIE uses special gases, such as $CH_3OH$, CO or $NH_3$ and their combinations, that will be highly etch selective between the mask material and the shield material, etching away the mask material at a slower rate than the shield material. As a result of this selectivity, the opening in the mask layer remains well defined and allows the gas to form a trench (300) within the shield layer, extending downward to the substrate (5), with sloping sidewalls (25) and a separation between the walls that is greater at the mask opening than at the trench bottom (the substrate), of between approximately 300 and 350 nanometers. In a preferred embodiment the combination of the gases $CO/NH_3$ at a pressure of 0.8 Pa and supplied at a rate of 15 sccm is used, with power to the substrate supplied at a rate of 1000 W and bias power being supplied at 1200 W. These etch parameters will produce an etch rate in the mask layer of approximately 2 nm/min and in the shield layer of approximately 34 nm/min. Thus, the single shield layer, as a result of the etched trench, is formed into two separated, facing shield layers, between approximately 0.3 and 0.35 microns apart, the facing sides having a sloping shape produced by the RIE etch. This sloping shape is important for aligning the magnetic pole tip and shaping it appropriately.

Figure 7:
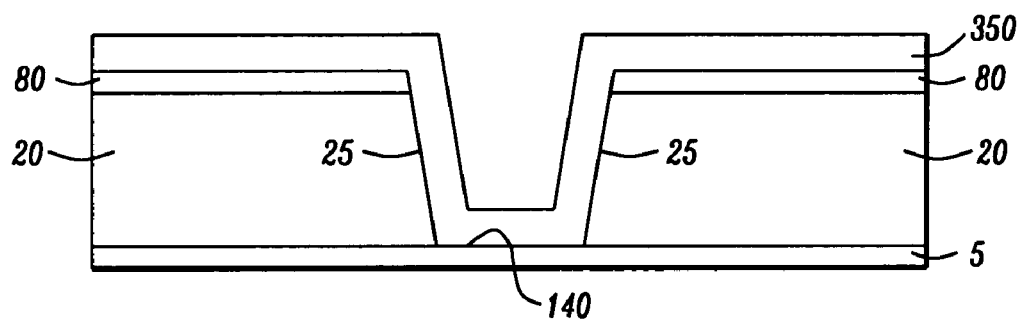

Referring next to FIG. 7, there is shown the fabrication of FIG. 6 subsequent to the deposition of a layer of alumina (350) on the mask layer (80), the alumina thereby also conformally covering the exposed trench surfaces (25) within the shield layer and the exposed substrate surface (140). The alumina layer is formed to a thickness between approximately 300 and 500 angstroms by a process of atomic layer deposition (ALD) or PVD and it will form a uniform side gap layer on either side of the pole tip that is about to be formed. This alumina layer is deposited to a thickness between approximately 500 and 1500 angstroms.

Figure 8:
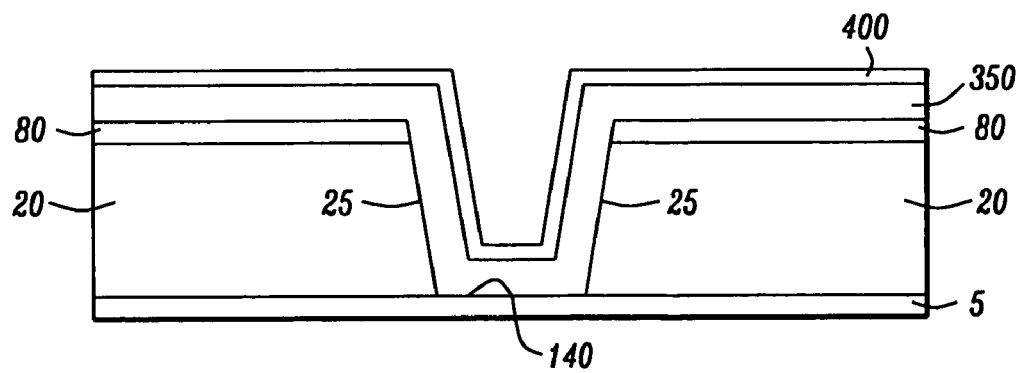

Referring next to FIG. 8, there is shown the fabrication of FIG. 7 subsequent to the deposition onto the surfaces of the alumina layer (350) of a seed layer (400) of Ta, Ru, or CoNiFe, formed to a thickness between approximately 500 and 1000 angstroms and suitable for the plating of a magnetic pole thereon.

Figure 9:
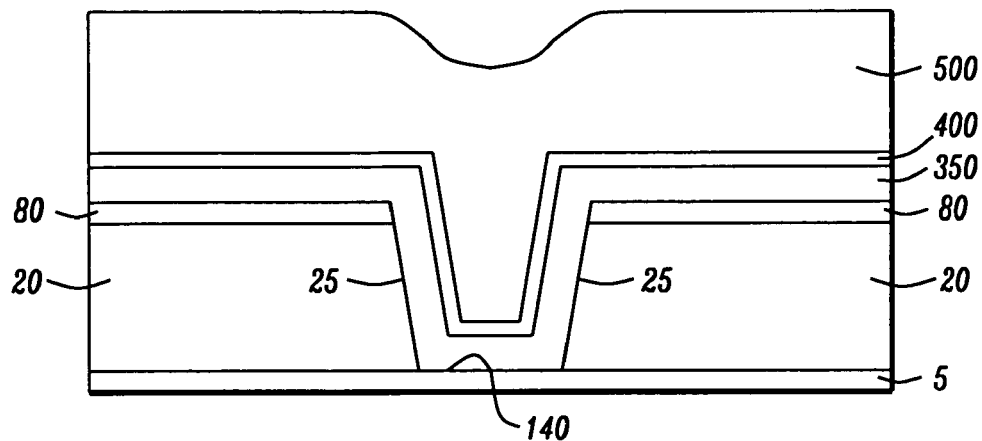

Referring now to FIG. 9, there is shown schematically the fabrication of FIG. 8 wherein a magnetic pole layer (500) has been plated onto the seed layer (400). The magnetic pole layer is preferably a layer of low coercivity magnetic material such as NiFe or FeNi and it is plated to a thickness sufficient to at least conformally fill the trench in a void-free manner.

Figure 10:
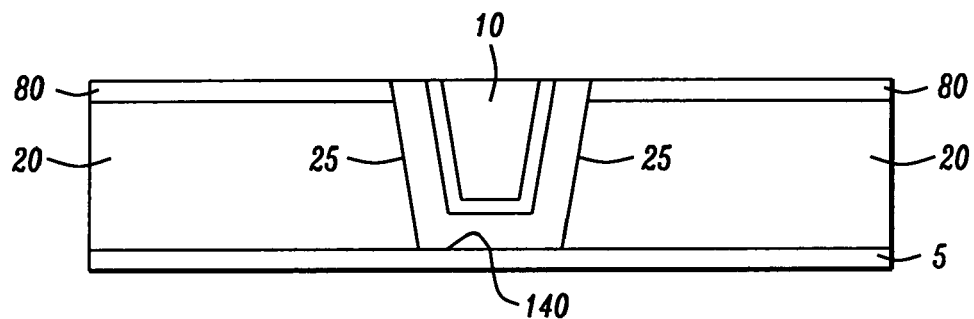

Referring next to FIG. 10, there is shown schematically the fabrication of FIG. 9 subsequent to the removal of excess portions of the magnetic pole layer with the exception of a pole tip portion (10) that conformally fills the trench and is, thereby, properly aligned by the trench and beveled to the truncated wedge shape of the trench which is the desired tip shape. As can be seen in the overhead view of FIG. 2, a rear portion of the pole (27) is also formed by the plating process and it extends behind the ABS plane, but this portion cannot be seen in the present figure. The removal of excess pole material is accomplished by a preliminary etch using CMP to remove the bulk of the material, followed by an IBE process that partially (or entirely) removes the mask layer (80) while planarizing the upper surface of the fabrication.

Figure 11:
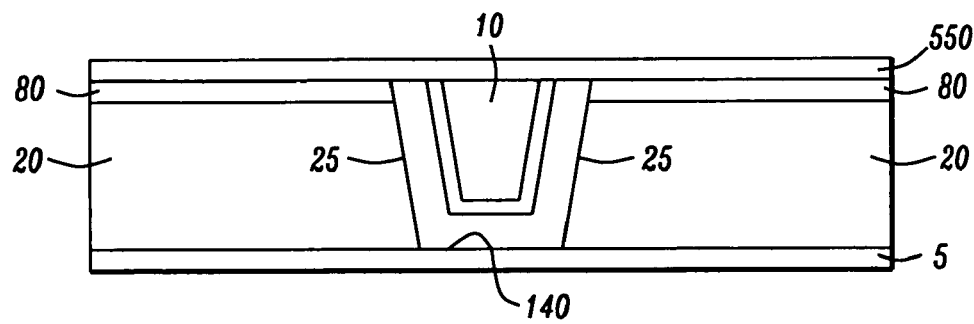

Referring next to FIG. 11, there is shown a schematic drawing of the fabrication of FIG. 10 subsequent to the deposition of a second alumina layer (550) to form a horizontal write gap layer extending over the exposed upper planarized surface of the fabrication. This alumina layer is formed by a process of PVD or ALD to a thickness between approximately 300 and 500 angstroms.

Referring back to FIG. 1, there is shown schematically the fabrication of FIG. 11 subsequent to the formation of a seed layer (600) covering the write gap layer (550) and the plating of an upper shield layer (40) onto the seed layer. The upper shield layer is formed of the same material as the side shield.

Figure 12:
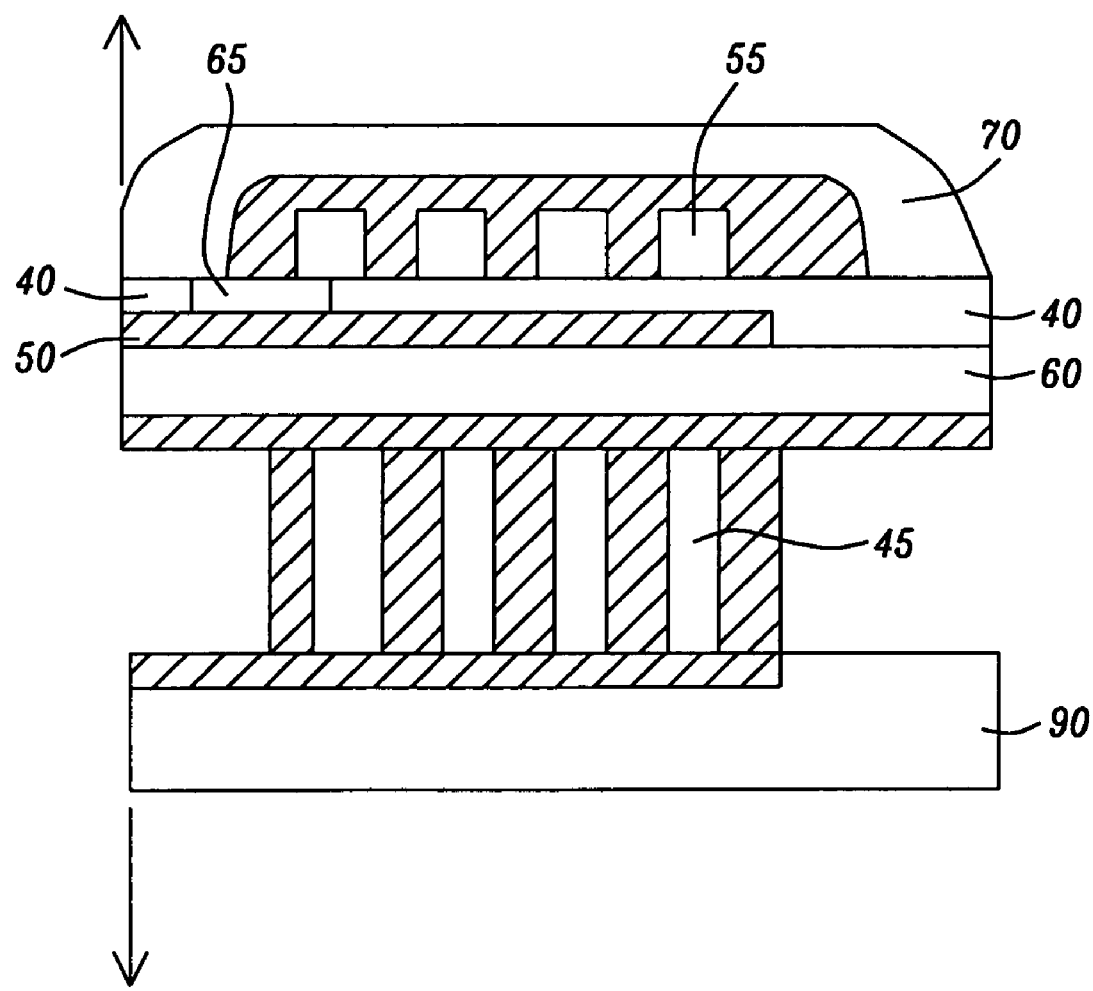
FIG. 12 is a schematic side view of an exemplary PMR read head incorporating the pole of the present invention.

Referring finally to FIG. 12, there is shown a schematic cross-sectional side view of an exemplary PMR head that incorporates the shielded pole structure of the present invention, the ABS of the head being indicated by the vertical double-ended arrow. The head is shown incorporating a two layer coil (shown with rectangular cross-sections), the upper portion (55) of the coil being contained between the pole of the present invention (60) and the substrate on which it is formed (5) and an upper pole piece (70). The lower portion of the coil (45) is situated between the pole (60) and substrate (5) and a lower shield (90). Also shown in the figure is the horizontal write gap layer (50) and the upper shield (40) that is stitched to an upper pole piece (40). An isolation gap (65) is formed to prevent flux leakage from the pole to the shield. The side shields cannot be seen in this view. While the particular head structure shown in the figure will achieve the objects provided by the shielded pole, the pole could be incorporated within other head designs as well.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a three-way, side shielded magnetic pole, while still forming and providing such a PMR head and pole and its method of formation in accord with the spirit and scope of the present invention as defined by the appended claims.

What is claimed is:

1. A perpendicular magnetic recording (PMR) head having a three-way side shielded pole comprising:

a substrate;

a pair of laterally disposed and separated side shields formed from a monolithic shield layer deposited on said substrate, the shields having coplanar air bearing surface (ABS) front surfaces and transverse, facing, sloping side surfaces, the separation between said side surfaces forming a uniform transverse trench having a truncated wedge-shaped cross-sectional shape in the ABS plane and, thereby, forming a similarly shaped opening at said ABS plane, said wedge being narrowest at said substrate;

a magnetic pole formed over said substrate, said pole having a pole tip formed within said wedge-shaped transverse trench and being, therefore, of the same wedge-shaped cross-sectional shape as said trench and said pole tip being centrally aligned by said trench shape within said trench and said pole tip terminating at said ABS surface;

an insulating side gap layer conformally formed about lateral and lower sides of said pole tip, separating said pole tip from said substrate and said side shields;

a horizontal, planar write gap layer formed over said pole tip and said side shields;

an upper shield formed over said write gap layer.

2. The PMR head of claim 1 further comprising spirally wound electrically conducting coils formed about said magnetic pole and capable of producing a magnetic field directed substantially perpendicularly to said ABS plane from said pole tip when said coils are electrically energized.

3. The PMR head of claim 1 wherein said side shields are formed of NiFe to a thickness between approximately 3000 and 4000 angstroms.

4. The PMR head of claim 1 wherein said upper shield is formed of NiFe to a thickness between approximately 3000 and 4000 angstroms.

5. The PMR head of claim 1 wherein said magnetic pole is formed of CoFe to a thickness between approximately 3000 and 4000 angstroms.

6. The PMR head of claim 1 wherein said write gap layers are formed of alumina to a thickness between approximately 300 and 500 angstroms.

7. The PMR head of claim 1 wherein said pole tip has a length between approximately 0.05 and 0.15 microns and a width between approximately 100 and 180 nanometers.

\* \* \* \* \*